March 24, 1925.

E. A. HERMANSON

TOBACCO PIPE

Filed July 30, 1924

1,531,094

E. A. Hermanson,
Inventor

By Clarence A. O'Brien
Attorney

Patented Mar. 24, 1925.

1,531,094

UNITED STATES PATENT OFFICE.

EDWARD A. HERMANSON, OF BEAVER FLAT, SASKATCHEWAN, CANADA.

TOBACCO PIPE.

Application filed July 30, 1924. Serial No. 729,119.

*To all whom it may concern:*

Be it known that I, EDWARD A. HERMANSON, a citizen of the United States, residing at Beaver Flat, in the Province of Saskatchewan and Dominion of Canada, have invented certain new and useful Improvements in a Tobacco Pipe, of which the following is a specification.

This invention relates to smoking pipes adapted to be used for the purpose of smoking tobacco and it consists in the novel features hereinafter described and claimed.

An object of the invention is to provide a pipe of the character stated which includes a bowl having a stem portion, there being provided in the side of the bowl and through the stem portion conduits which communicate with each other at the end portion of the stem and which communicate with the upper edge of the bowl and a pit located within the bowl respectively. A detachable cover is mounted over the bowl. A grate is located in the bowl above the pit and air apertures pass transversely through the side of the bowl and enter the same at points above the grate. A flue is located within the bowl and spaced from the sides thereof and is disposed above the grate and spaced above the openings which pass through the side of the bowl and which are disposed above the grate. A mouth piece of suitable form is detachably connected with the stem portion of the bowl in a usual manner.

In the accompanying drawing:—

Figure 1:
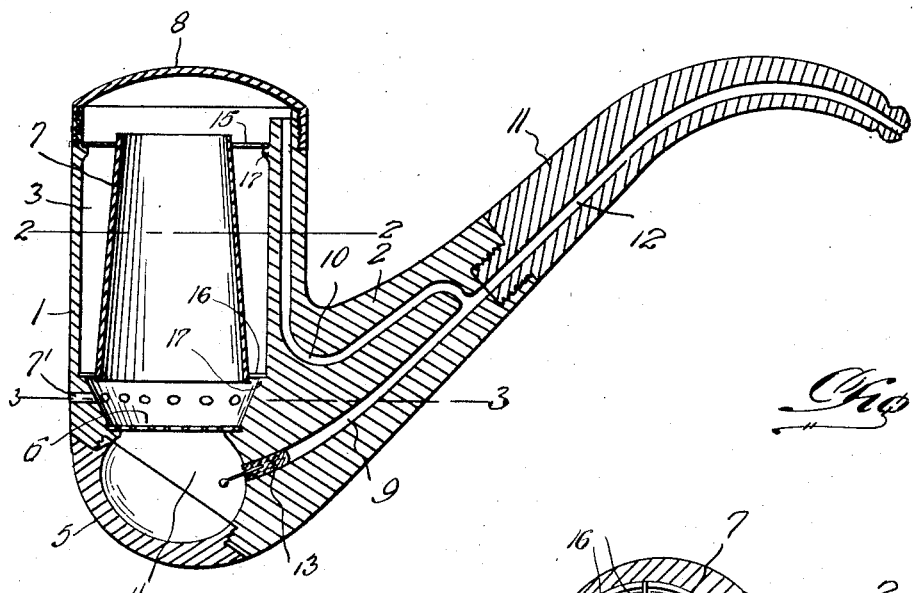
Figure 1 is a vertical longitudinal sectional view of the pipe.
Figure 2:
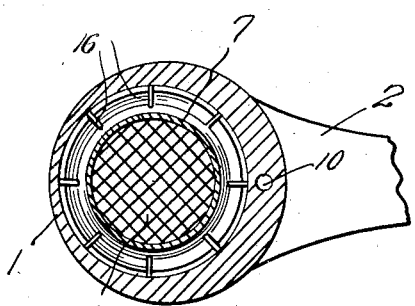
Figure 2 is a transverse sectional view thereof cut on the line 2—2 of Figure 1.
Figure 3:
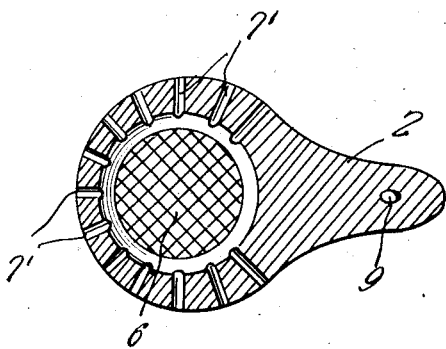
Figure 3 is a transverse sectional view thereof cut on the line 3—3 of Figure 1.

As illustrated in the accompanying drawing the pipe consists of a bowl 1 having a stem portion 2, the bowl 1 is provided with the usual chamber 3 below which is located a pit 4. The pit 4 is closed by a detachable cap 5 which may be screw threaded in the lower portion of the bowl in an appropriate manner. A grate 6 is located in the lower portion of the chamber 3 above the pit 4 and air ducts 7' pass transversely through the sides of the bowl and communicate with the chamber 3 at points above the grate 6, a cone shaped flue 7 is located within the chamber 3 and spaced from the side walls thereof and the lower end of the flue 7 spaced above the ducts 7'. Pins 15 extend laterally from the top of the flue 7 and rest on shoulder 17 in the top of the chamber 3 while pins 16 project laterally from the bottom of the flue and rest on the shoulder 17 at the bottom of the chamber 3. Cover 8 is applied to the upper end of the bowl 1. A conduit 9 communicates at one end with the pit 4 and traverses the length of the stem portion 2 of the bowl. A conduit 10 leads in from the upper edge of the bowl 1 and extends into the stem portion 2 and communicates with the conduit 9. A mouthpiece 11, of conventional form, may be connected with the stem portion 2 in the usual manner and the said mouth piece is provided with a conduit 12 which traverses the length thereof and which is adapted to communicate with the end of the conduit 9 in the stem portion 2 of the bowl. A wad of absorbent material may be inserted in the lower end of the conduit 9 and may be extracted therefrom when the cover 5 is removed from the lower portion of the bowl 1.

In use the cover 8 is removed and the flue 7 is loaded with the tobacco which rests upon the grate 6. The cover 8 is then placed in position over the upper end of the bowl 1. The cap 5 is then removed and the pipe is held in the hand so that the outer ends of the air ducts 7' are closed. The mouth piece 11 is then placed in the mouth and suction draft is created through the ducts 12 and 10. The lighted match is then applied to the tobacco placing the match in the pit 4 and the draft which is created carries the flame up into the column of tobacco and the said column burns from the bottom. After the light is started at the bottom of the column the cap 5 is replaced in position at the bottom of the pit 4 and the smoking operation is started and may be continued. As the ash forms, it sifts through the grate 6 and deposits in the pit 4 and upon the cap 5. Any condensation which may take place in the conduits 10 and 12 will drip or drain back through the conduit 9 into the pit 4, and in doing so the moisture may be held back to a certain extent by the filtering wad 13 and as the moisture filters through the said wad the heavier products of the condensation will remain in the conduit 9. To clean the conduits of the material which may accumulate therein, the mouth piece 11 is removed and the cap 5 is detached. The wad 13 is taken out of the conduit and a wire or similar object is passed through the conduit 9 and the accumulated matter is thereby ejected therefrom.

Having described the invention, what I claim is:—

1. A tobacco pipe comprising a bowl having a stem portion, the said bowl being provided with an internally located chamber, and a pit, a grate disposed within the bowl between the chamber and the pit, air ducts passing transversely through the side of the bowl and communicating at their inner ends with the chamber at points above the grate, a flue located within the chamber, a cover for the bowl, said bowl and stem portion having communicating conduits, one of them leading in from the end of the bowl and the other leading in from the pit.

2. A tobacco pipe comprising a bowl having a stem portion, the bowl being provided with an internally located chamber, and a pit, a closure for the pit, a grate located within the bowl above the pit, the bowl being provided with air ducts which communicate at their inner ends with the chamber at points above the grate, a flue located within the chamber, the bowl and the stem portion being provided with communicating conduits, one of which leads in from the end of the bowl and the other leads in from the pit and a cover for the upper end of the bowl.

3. A tobacco pipe comprising a bowl having a stem portion, the bowl having an internally located chamber and a pit, a grate disposed within the chamber above the pit, the bowl being provided at its sides with air ducts which communicate at their inner ends with the chamber at points above the grate, a flue located in the chamber and being spaced from the side walls thereof, a cover for the upper end of the bowl, the bowl and the stem portion being provided with communicating conduits one of which leads in from the upper edge of the bowl and the other leads in from the pit.

In testimony whereof I affix my signature.

EDWARD A. HERMANSON.